United States Patent
Hanlon et al.

(10) Patent No.: US 10,119,477 B2
(45) Date of Patent: Nov. 6, 2018

(54) GAS TURBINE ENGINE WITH A MULTI-SPOOL DRIVEN FAN

(71) Applicant: United Technologies Corporation, Hartford, CT (US)

(72) Inventors: Christopher J. Hanlon, Sturbridge, MA (US); Daniel B. Kupratis, Wallingford, CT (US); Walter A. Ledwith, Marlborough, CT (US)

(73) Assignee: United Technologies Corporation, Farmington, CT (US)

( * ) Notice: Subject to any disclaimer, the term of this patent is extended or adjusted under 35 U.S.C. 154(b) by 485 days.

(21) Appl. No.: 14/600,978

(22) Filed: Jan. 20, 2015

(65) Prior Publication Data

US 2016/0208692 A1    Jul. 21, 2016

(51) Int. Cl.
  *F02K 3/075* (2006.01)
  *F02K 3/077* (2006.01)
  *F02C 9/18* (2006.01)

(52) U.S. Cl.
  CPC ............... *F02C 9/18* (2013.01); *F02K 3/075* (2013.01); *F02K 3/077* (2013.01); *Y02T 50/671* (2013.01)

(58) Field of Classification Search
  CPC . F02C 9/18; F02K 3/075; F02K 3/077; F01D 17/18
  See application file for complete search history.

(56) References Cited

U.S. PATENT DOCUMENTS

| | | | | |
|---|---|---|---|---|
| 4,064,692 A | * | 12/1977 | Johnson | F02K 3/075 60/762 |
| 4,085,583 A | * | 4/1978 | Klees | F02K 3/075 60/204 |
| 4,813,229 A | * | 3/1989 | Simmons | F02C 7/18 60/204 |
| 5,261,228 A | * | 11/1993 | Shuba | F01D 17/105 60/226.3 |
| 5,404,713 A | * | 4/1995 | Johnson | F02K 1/825 60/204 |
| 5,806,303 A | | 9/1998 | Johnson | |
| 5,809,772 A | | 9/1998 | Giffin, III et al. | |
| 6,182,435 B1 | | 2/2001 | Niggemann et al. | |
| 6,662,546 B1 | * | 12/2003 | Giffin, III | F02C 7/04 342/4 |
| 6,748,743 B1 | | 6/2004 | Foster-Pegg | |
| 7,246,484 B2 | | 7/2007 | Giffin, III et al. | |
| 7,377,100 B2 | | 5/2008 | Bruno et al. | |
| 7,395,657 B2 | | 7/2008 | Johnson | |
| 7,926,261 B2 | | 4/2011 | Porte | |
| 8,756,910 B2 | | 6/2014 | Donovan et al. | |
| 9,121,465 B2 | * | 9/2015 | Wright | F16F 5/00 |
| 2010/0180572 A1 | * | 7/2010 | Wadia | F01D 5/022 60/226.1 |

(Continued)

*Primary Examiner* — Gerald L Sung
*Assistant Examiner* — Rene Ford
(74) *Attorney, Agent, or Firm* — O'Shea Getz P.C.

(57) ABSTRACT

A gas turbine engine includes low and high spools constructed and arranged to rotate about an engine axis. The low spool drives at least one leading stage of a fan section and the high spool drives an aft stage of the fan section. The aft stage may generally include a bypass duct for controllably flowing a bypass stream directly from the leading stage and controllably and/or selectively into an auxiliary flowpath and/or into a second flowpath both located radially outward from a core flowpath.

17 Claims, 4 Drawing Sheets

(56) References Cited

U.S. PATENT DOCUMENTS

| | | | |
|---|---|---|---|
| 2011/0167791 A1* | 7/2011 | Johnson | F01D 17/162 |
| | | | 60/226.3 |
| 2012/0131902 A1 | 5/2012 | Baughman et al. | |
| 2012/0144843 A1* | 6/2012 | Donovan | F01D 25/12 |
| | | | 60/806 |
| 2015/0211441 A1* | 7/2015 | Moon | F02K 3/077 |
| | | | 60/262 |

* cited by examiner

| Group | | | | | HX (120) Cold Side Flow Sources (Contribution) | | | Auxiliary Stream (76) Flow Sources | | | | Second Stream (72) Flow Sources | | |
|---|---|---|---|---|---|---|---|---|---|---|---|---|---|---|
| Para-meter | Mode (132) | Flight Condition (134) | Engine Thrust (136) | ISO. Valve (92) | Selector Valve (94) | Bypass Duct (82) | Primary Duct (85) | Bypass Duct (82) | Primary Duct (85) | HX (120) Cold Side Flow | Aux. Stream Nozzle (79) Flow | Bypass Duct (82) | Primary Duct (85) | 2nd Stream Nozzle (77) Flow |
| FIG. 2 | Max Power | Takeoff | High | Closed (100) | Neutral (102) | 0% | 100% | 0% | 0% | 100% | Low | 0% | 100% | Max |
| FIG. 3 | Exhaust Manage-ment | Takeoff; Climb; High Cruise | High | Closed (100) | Selected State (106) | 0% | 100% | 0% | Major | Minor | Medium | 0% | 100% | High |
| FIG. 4 | High Efficiency | Loiter; Cruise | Medium | Open (110) | Neutral (102) | 0% | 100% | Major | 0% | Minor | High | 0% | 100% | Medium |
| FIG. 5 | Exhaust Manage-ment | Low Cruise | Low | Open (110) | Selected State (112) | Minor | Major | Major | 0% | Minor | Medium | Minor | Major | High |

*FIG. 7*

GAS TURBINE ENGINE WITH A MULTI-SPOOL DRIVEN FAN

BACKGROUND

The present disclosure relates to a gas turbine engine, and more particularly to an engine having a multi-spool driven fan section.

Gas turbine engines, such as those which power modern military aircraft, include a compressor section to pressurize a supply of air, a combustor section to burn a hydrocarbon fuel in the presence of the pressurized air, and a turbine section to extract energy from the resultant combustion gases and generate thrust. Downstream of the turbine section, an augmentor section, or "afterburner", is operable to selectively increase the thrust. The increase in thrust is produced when fuel is injected into the core exhaust gases downstream of the turbine section and burned with the oxygen contained therein to generate a second combustion.

Variable cycle gas turbine engines power aircraft over a range of operating conditions yet achieve countervailing objectives such as high specific thrust and low fuel consumption. The variable cycle gas turbine engine essentially alters a bypass ratio during flight to match requirements. This facilitates efficient performance over a broad range of altitudes and flight conditions to generate high thrust for high-energy maneuvers yet optimize fuel efficiency for cruise and loiter.

Variable cycle gas turbine engines require an effective actuation system to vary the bypass ratio (BPR) between maximum afterburning conditions and cruise conditions to operate the engine at various cycle points. Variable cycle gas turbine engines are typically of a three-stream engine architecture in which a two-stage fan directly feeds all three streams, e.g., core stream, second stream, third stream. Typically, a part-span booster fan stage feeds the core stream and the second stream. Although effective, this architecture requires a relatively complex fan design and a challenging intermediate case design due to the limited area available to execute three streams in the same required package of traditional two stream engines.

SUMMARY

A gas turbine engine according to one, non-limiting, embodiment of the present disclosure includes a high spool constructed and arranged to rotate about an engine axis; a low spool constructed and arranged to rotate about the engine axis; a fan leading stage connected for rotation to the low spool; and a fan aft stage connected for rotation to the high spool.

Additionally to the foregoing embodiment, the engine includes a high pressure turbine connected to the high spool.

In the alternative or additionally thereto, in the foregoing embodiment, the engine includes a low pressure turbine connected to the low spool.

In the alternative or additionally thereto, in the foregoing embodiment, the engine includes a fan outer housing axially aligned to and circumferentially surrounding the leading and aft stages; and a fan inner housing spaced radially inward from the outer housing, located aft of the leading stage, and circumferentially surrounding the aft stage, wherein a bypass duct is defined radially between the outer and inner housing for at least partially flowing air from the leading stage.

In the alternative or additionally thereto, in the foregoing embodiment, the engine includes a core case concentrically located about the engine axis, wherein a core flowpath is defined radially inward of the core case for flowing a core stream; a second case spaced radially outward of the core case, wherein a second flowpath is defined radially between the core and second case for flowing a second stream; and an outer case spaced at least in-part radially outward from the second case, wherein an auxiliary flowpath is defined at least in-part radially between the second and outer cases for flowing an auxiliary stream, and the bypass duct is in selective, direct, communication with at least one of the second and auxiliary flowpaths.

In the alternative or additionally thereto, in the foregoing embodiment, the engine includes a control valve arrangement constructed and arranged to control airflow from the bypass duct to the second flowpath.

In the alternative or additionally thereto, in the foregoing embodiment, the engine includes a control valve arrangement constructed and arranged to control airflow from the bypass duct to the auxiliary flowpath.

In the alternative or additionally thereto, in the foregoing embodiment, the control valve arrangement includes an isolation valve feature to selectively prevent flow through the bypass duct.

In the alternative or additionally thereto, in the foregoing embodiment the control valve arrangement includes a selector valve feature for controllably diverting airflow between the auxiliary and second flowpaths.

In the alternative or additionally thereto, in the foregoing embodiment, the engine includes an airflow control system including at least one heat exchanging device arranged to heat a portion of the second stream from the second flowpath upon entry into the auxiliary flowpath.

In the alternative or additionally thereto, in the foregoing embodiment, the at least one heat exchanging device includes a heat exchanger and a control valve constructed and arranged to control flow through the heat exchanger.

In the alternative or additionally thereto, in the foregoing embodiment, the engine includes a control valve arrangement constructed and arranged to control airflow from the bypass duct to the second flowpath, and wherein the airflow control system includes a controller constructed and arranged to control the control valve arrangement and the control valve of the heat exchanging device.

In the alternative or additionally thereto, in the foregoing embodiment, the heat exchanging device includes a conduit loop in direct fluid communication between the core flowpath and a hot side of the heat exchanger for flowing heated air from the core flowpath to the hot side and returning the cooled hot air from the hot side and through the core case for cooling components within the core case, and wherein a cold side of the heat exchanger is constructed and arranged to flow the portion of the second stream for cooling the hot air.

A gas turbine engine according to another, non-limiting, embodiment includes a low pressure turbine; a high pressure turbine proximate to the low pressure turbine; a first fan stage driven by the low pressure turbine; and a second fan stage driven by the high pressure turbine.

Additionally to the foregoing embodiment, the second fan stage includes a bypass duct in direct, selective, communication between an auxiliary flowpath and a second flowpath.

A method of operating a gas turbine engine according to another, non-limiting, embodiment, includes the steps of driving a leading stage of a fan section with a low spool; and driving an aft stage of a fan section with a high spool.

Additionally to the foregoing embodiment, the method includes the steps of flowing an incoming airflow through the leading stage; and utilizing a flow control system to controllably flow at least a portion of the incoming airflow through the aft stage.

In the alternative or additionally thereto, in the foregoing embodiment, the method includes the step of flowing a portion of the incoming airflow through a bypass duct that bypasses the aft stage.

In the alternative or additionally thereto, in the foregoing embodiment, the method includes the step of controlling a valve arrangement with a controller to control the flow of a bypass stream through the bypass duct.

In the alternative or additionally thereto, in the foregoing embodiment, the method includes the step of controlling the valve arrangement to selectively expel the bypass stream into a second stream, an auxiliary stream, or both.

The foregoing features and elements may be combined in various combinations without exclusivity, unless expressly indicated otherwise. These features and elements as well as the operation thereof will become more apparent in light of the following description and the accompanying drawings. It should be understood, however, the following description and drawings are intended to be exemplary in nature and non-limiting.

BRIEF DESCRIPTION OF THE DRAWINGS

Various features will become apparent to those skilled in the art from the following detailed description of the disclosed, non-limiting, embodiments. The drawings that accompany the detailed description can be briefly described as follows:

FIG. 7 is a table illustrating a variety of modes of engine operation.

DETAILED DESCRIPTION

Figure 1:
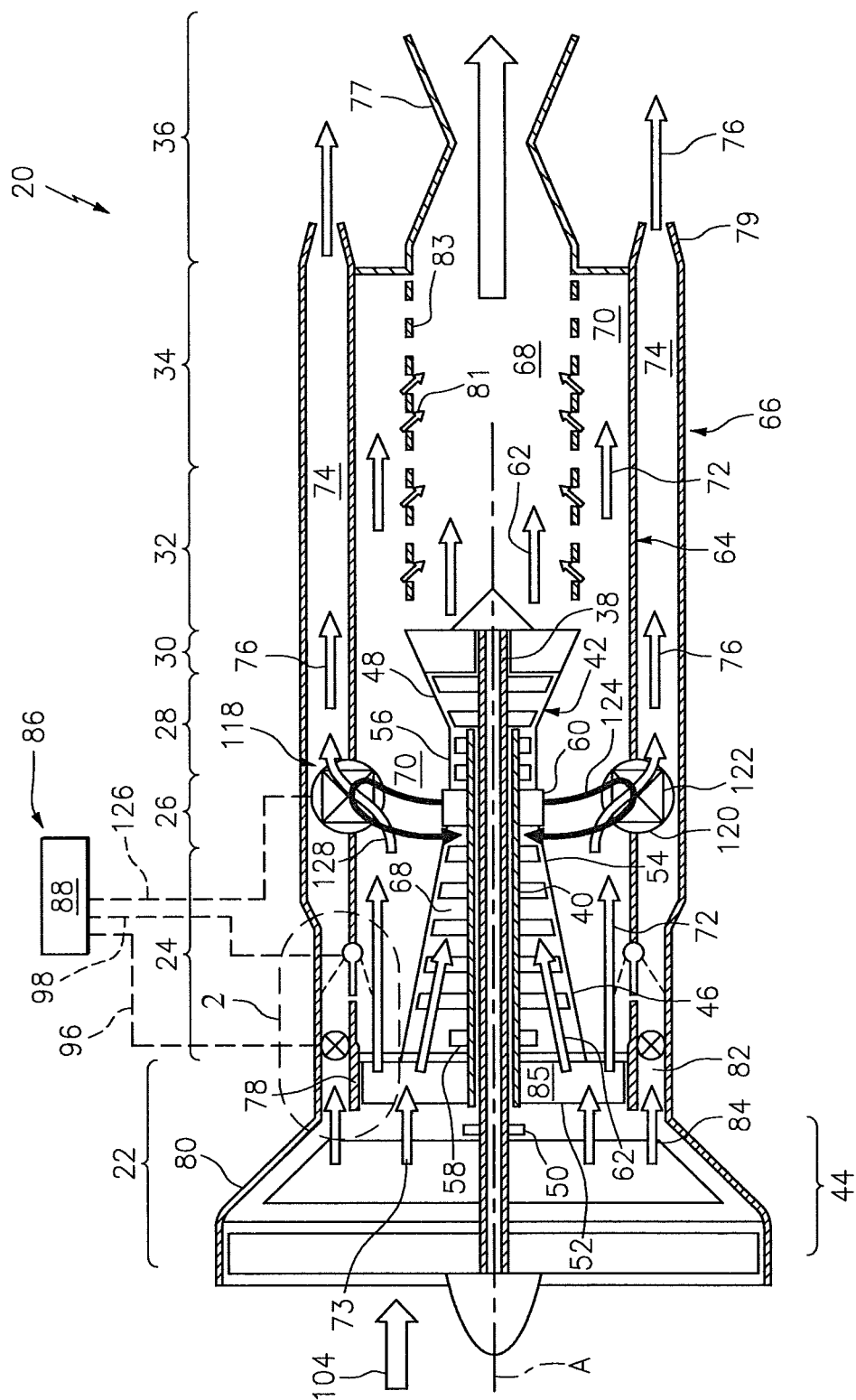
FIG. 1 is a schematic cross-section of a gas turbine engine of the present disclosure.

FIG. 1 schematically illustrates a gas turbine engine 20. The gas turbine engine 20 is disclosed herein as a two-spool turbo fan that generally incorporates a fan section 22, a compressor section 24, a combustor section 26 and a turbine section 28. Alternative engines might include a turbine exhaust case section 30 followed in a downstream direction by an augmentor section 32, an exhaust duct section 34 and a nozzle section 36. The fan section 22 drives air along a second flowpath while the compressor section 24 drives air along a core flowpath for compression and communication into the combustor section 26 then expansion through the turbine section 28. The fan, compressor and turbine sections 22, 24, 28 may each include various architectures that, for example, include a plurality of stages, each with or without various combinations of blades and variable or fixed guide vanes orientated about an engine axis A.

Variable cycle gas turbine engines power aircraft over a range of operating conditions and essentially alters a bypass ratio during flight to achieve objectives that may be countervailing (such as high specific thrust for high-energy maneuvers) yet optimizes fuel efficiency for cruise and loiter modes of operation. Although depicted as an augmented low bypass turbofan in the disclosed, non-limiting, embodiment, it is understood that the concepts described herein are applicable to other types of turbine engines including non-augmented engines, geared architecture engines, high bypass and/or direct drive turbofans, turboshafts, and three-spool (plus fan) turbofans wherein an intermediate spool includes an intermediate pressure compressor ("IPC") between a Low Pressure Compressor ("LPC") and a High Pressure Compressor ("HPC"), and an Intermediate Pressure Turbine ("IPT") between the High Pressure Turbine ("HPT") and the Low Pressure Turbine ("LPT").

The engine 20 generally includes a low spool 38 and a high spool 40 mounted for rotation about the engine axis A, and relative to an engine core case 42, via several bearing structures (not shown). The low spool 38 generally includes an inner shaft that interconnects at least one leading fan stage 44 of the fan section 22, a LPC 46 of the compressor section 24 and a LPT 48 of the turbine section 28. The inner shaft of the low spool 38 drives the leading fan stage 44 directly, or through a geared architecture 50 to drive the leading fan stage 44 at a lower speed than the low spool 38. An exemplary reduction transmission is an epicyclic transmission of the architecture 50, namely a planetary or star gear system.

The high spool 40 includes an outer shaft that interconnects at least one aft fan stage 52 of the fan section 22, a HPC 54 of the compressor section 24 and a HPT 56 of the turbine section 28. The outer shaft of the high spool 40 drives the aft fan stage 52 directly, or through a geared architecture 58 to drive the aft fan stage 52 at a lower speed than the high spool 40. Like the geared architecture 50, an exemplary reduction transmission of the architecture 58 is an epicyclic transmission, namely a planetary or star gear system.

A combustor (not shown) of the combustor section 26 is arranged between the HPC 54 and the HPT 56 and, at least in-part, radially within a diffuse case module 60 of the core engine case 42. The inner and outer shafts of the respective low and high spools 38, 40 may be concentric and rotate about the engine axis A that is collinear with their, respective, longitudinal axis. A core air stream (see arrow 62) is compressed by the LPC 46 then the HPC 54, mixed with fuel and burned in the combustor of the combustor section 26, then expanded over the HPT 56 and the LPT 48. The LPT 48 and HPT 56 rotationally drive the respective low spool 38 and high spool 40 in response to the expansion.

By tying the at least one aft stage 52 of the fan section 22 to the HPT 56, the fan pressure ratio will lapse more strongly from high engine power to low engine power (i.e. steeper operating characteristic); thereby, improving part power propulsion efficiency and reducing fuel consumption at cruise. Also, by distributing the fan section 22 work across two spools 38, 40, the turbomachinery will be more aerodynamically and thermodynamically balanced allowing for a more optimal HPT and LPT component aero design and lighter weight.

In one non-limiting example, the gas turbine engine 20 is a high-bypass geared aircraft engine. In a further example, the gas turbine engine 20 bypass ratio is greater than about six (6:1). The geared architecture 48 can include an epicyclic gear train, such as a planetary gear system or other gear system. The example epicyclic gear train has a gear reduction ratio of greater than about 2.3:1, and in another example is greater than about 2.5:1. The geared turbofan enables operation of the low spool 38 at higher speeds that can increase the operational efficiency of the LPC 46 and LPT 48 and render increased pressure in a fewer number of stages.

A pressure ratio associated with the LPT 48 is pressure measured prior to the inlet of the LPT 48 as related to the pressure at the outlet of the LPT 48 prior to the exhaust section 36 of the gas turbine engine 20. In one non-limiting embodiment, the bypass ratio of the gas turbine engine 20 is greater than about ten (10:1), the fan diameter is significantly larger than that of the LPC 46, and the LPT 48 has a pressure ratio that is greater than about five (5:1). It should be understood; however, that the above parameters are only exemplary of one embodiment of a geared architecture engine and that the present disclosure is applicable to other gas turbine engines including direct drive turbofans.

In one embodiment, a significant amount of thrust is provided by a bypass flow path due to the high bypass ratio. The fan section 22 of the gas turbine engine 20 is designed for a particular flight condition—typically cruise at about 0.8 Mach and about 35,000 feet (10,668 meters). This flight condition, with the gas turbine engine 20 at its best fuel consumption, is also known as Thrust Specific Fuel Consumption (TSFC). TSFC is an industry standard parameter of fuel consumption per unit of thrust.

Fan Pressure Ratio is the pressure ratio across a blade of the fan section 22 without the use of a Fan Exit Guide Vane System. The low Fan Pressure Ratio according to one, non-limiting, embodiment of the example gas turbine engine 20 is less than 1.45. Low Corrected Fan Tip Speed is the actual fan tip speed divided by an industry standard temperature correction of $(T/518.7)^{0.5}$ in which "T" represents the ambient temperature in degrees Rankine. The Low Corrected Fan Tip Speed according to one non-limiting embodiment of the example gas turbine engine 20 is less than about 1,150 feet per second (351 meters per second).

Aside from the core case 42, the engine 20 may include: a fan duct, intermediate, case 64 spaced radially outward and, at least in-part, axially aligned to the core case 42; and an outer case 66 spaced, at least in-part, radially outward from, and axially aligned to, the intermediate case 64. The core case 42 generally defines a radially outward boundary of an annular core flowpath 68 for the flow of the core stream 62. The core and intermediate cases 42, 64 generally define, respective, radially inward and outward boundaries of an annular second flowpath 70 for the flow of a second stream (see arrow 72) of air. Generally, the second flowpath 70 may be part of a fan duct and the second stream 72 may be a high or low bypass air stream depending upon the engine application. The intermediate and outer cases 64, 66 generally define, respective, radially inward and outward boundaries of an annular auxiliary flowpath 74 for the flow of an auxiliary stream (see arrow 76) of air. It is further understood and contemplated that the auxiliary flowpath 74 may not be annular, and instead may generally be a series of axially extending flowpaths extending axially and circumferentially spaced or segmented from one-another.

A primary stream (see arrow 73) of air that enters the aft stage 52 of the fan section 22 is divided between the core stream 62 through the core flowpath 68, and the second stream 72 through the second flowpath 70. The core stream 62 is compressed by the compressor section 24 mixed with fuel and burned in the combustor section 26, then expanded through the turbine section 28, at least partially deswirled by airfoils (not shown) of the turbine exhaust case section 30, then exhausted through the exhaust duct section 34 and a mixed flow exhaust nozzle 77 of the nozzle section 36. Fuel may also be selectively injected into the core stream 70 in the augmentor section 32 downstream of the turbine section 28 to generate additional thrust through the mixed flow exhaust nozzle 77 from the exhaust duct section 34.

The exhaust duct section 34 may be circular in cross-section as typical of an axis-symmetric augmented low bypass turbofan. Alternatively or additionally, the exhaust duct section 34 may be non-axisymmetric in cross-section or other shape and/or non-linear with respect to the central longitudinal engine axis A to form, for example, a serpentine shape to block direct view to the turbine section. The core flowpath 68 terminates with the mixed flow exhaust nozzle 77 of the nozzle section 36 that may include, for example, various fixed, variable, convergent/divergent, two-dimensional and three-dimensional nozzle systems. The auxiliary flowpath 74 terminates at an auxiliary nozzle 79 of the nozzle section 36, and generally located radially outward from the exhaust nozzle 77.

The second stream 72 flowing through the second flowpath 70 may be utilized, for example, to enhance heat transfer or pressurize, another component or cavity. Moreover, the second stream 72 may be, at least partially, injected into the core flowpath 68 adjacent the augmentor section 32 and the exhaust duct section 34 for exhaust through the mixed flow exhaust nozzle 77 (illustrated schematically by flow arrows 81 through an augmentor liner 83). That is, the core stream 62 and the second stream 72 may be combined and mixed for ejection through the mixed flow exhaust nozzle 77.

Figure 2:
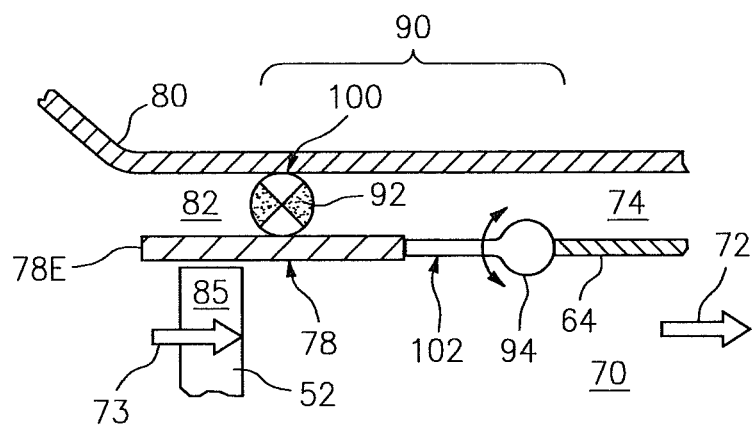
FIG. 2 is an enlarge view of a valve arrangement with an isolation valve of the arrangement in a closed position and a selector valve of the arrangement in a neutral state, and take from circle 2 in FIG. 1.

Referring to FIGS. 1 and 2, the fan section 22 of the engine 20 includes inner and outer fan housings 78, 80. The inner fan housing 78 may generally be a forward extension of the intermediate case 64 and is located radially outward from and, at least in-part, axially aligned to the aft fan stage 52 of the fan section 22. The inner housing 78 may include a forward, distal, edge 78E that is circumferentially continuous and located immediately aft of the leading fan stage(s) 44. The fan outer housing 80 is circumferentially continuous, surrounds the leading and aft stages 44, 52 of the fan section 22 and may generally be a forward projecting extension of the outer case 66. A rearward or downstream portion of the outer housing 80 is spaced radially outward from the inner housing 78 and, together, form or define an annular bypass duct or flowpath 82 for the flow of a bypass stream (see arrow 84) of air that generally flows from the leading stage 44, bypasses the aft stage 52 and controllably enters the second and/or auxiliary flowpaths 70, 74 to combine with respective air streams 72, 76.

The aft stage 52 is located in a primary duct or flowpath 85 generally defined by a radially inward facing side of the inner housing 78. At least a substantial portion of the air that exits the fan leading stage 44 flows through the primary duct 85 (and consequently the aft stage 52) as the primary airstream 73. Immediately downstream of the aft fan stage 52, the primary stream 73 is generally divided into the second stream 72 and the core stream 62.

An airflow control system 86 of the engine 20 may facilitate the control of air flow through the bypass duct 82, through the auxiliary flowpath 74, and through the second flowpath 70, or any combination thereof. The control system 86 may include a controller 88 and a control valve arrangement 90 (see FIG. 2) that may have an isolation valve or duct blocker 92, a diverter or selector valve 94. The controller 88 may receive sensory or operator input, processes the input, and outputs electronic control signals 96, 98 that operate the respective isolation and selector valves 92, 94. It is contemplated and understood that the control valve arrangement 90 may contain any variety of valve configurations including single-bodied units capable of both pathway isolation and flow diversion between two downstream pathways. It is further understood that the term 'valve' may include any variety of structures including a plurality of blocker doors and/or aerodynamically shaped flaps that may be circumferentially distributed and operated by a common sync-ring as one, non-limiting, example.

The controller 88 may be, for example, part of a flight control computer, a portion of a Full Authority Digital Engine Control (FADEC), a stand-alone unit or other system. The control module typically includes a processor, a memory, and an interface. The processor may be any type of microprocessor having desired performance characteristics. The memory may be any computer readable medium that stores data and control algorithms such as logic as described herein. The interface facilitates communication with other components such as an actuator of the valve arrangement 90 that operates one or both of the valves 92, 94.

The isolation valve 92 may generally be located in the bypass duct 82 and may be generally supported by at least one of the inner and outer housings 78, 80. The diverter valve 94 may generally be integrated between, and supported by at least one of, the inner housing 78 and the intermediate case 64. As best shown in FIG. 2, when the isolation valve 92 is in a closed position 100 and the diverter valve 94 is in a neutral state 102 that facilitates aerodynamic considerations, all of the incoming airflow (see arrow 104 in FIG. 1) is directed through both the leading and aft stages 44, 52 of the fan section 22. When exiting the fan section 22, the airflow 104 (i.e. with valve 92 closed) is generally divided into the core stream 62 and the second stream 72. In this configuration, the engine 20 is capable of maximum power with high thrust that may be advantageous for takeoff flight conditions.

Figure 3:
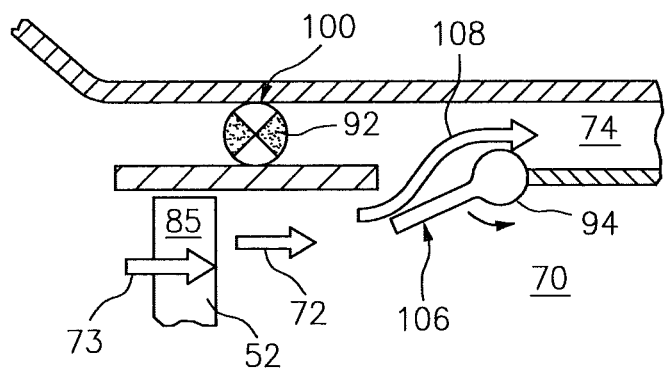
FIG. 3 is an enlarged view of the valve arrangement similar to FIG. 2 but with the selector valve in a first selected state.

Referring to FIG. 3, when the isolation valve 92 is in the closed position 100 and the diverter valve 94 is in a second stream receiving state 106, all of the incoming airflow 104 is directed through both the leading and aft stages 44, 52 of the fan section 22. In addition, a portion (see arrow 108) of the second stream 72 is diverted from the second flowpath 70 and enters the auxiliary flowpath 74 to join with the auxiliary stream 76. In this configuration, the engine 20 is capable of operating in an exhaust management mode with high thrust that may be advantageous for takeoff, climb, and high-speed cruise flight conditions.

Figure 4:
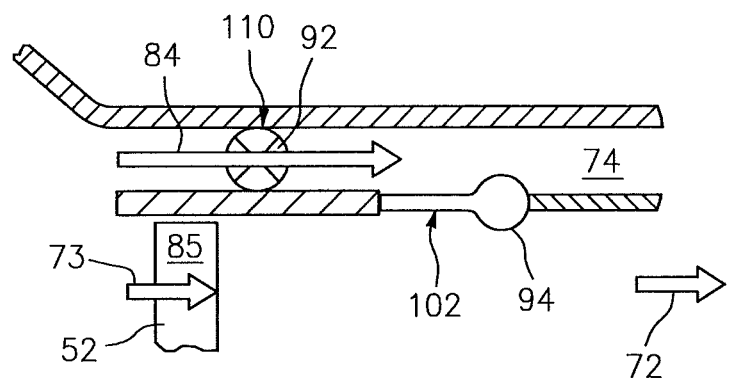
FIG. 4 is an enlarged view of the valve arrangement similar to FIG. 2 but with the isolation valve in an open position.

Referring to FIG. 4, when the isolation valve 92 is in an open position 110 and the diverter valve 94 is in the neutral state 102, a portion (i.e. bypass airstream 84) of the incoming airflow 104 that flows through the leading fan stage(s) 44 does not flow through the aft stage 52 and instead is bypassed and directly enters the auxiliary flowpath 74. Because the diverter valve 94 is in the neutral position 102, none of the second stream 72 enters the auxiliary flowpath 74 via the diverter valve 94 of the valve arrangement 90. In this configuration, the engine 20 is capable of high fuel efficiency operation during loiter and cruise flight conditions with low thrust. That is, the augmented engine 20 may more closely resemble a high bypass turbofan engine more common in the commercial aviation industry.

Figure 5:
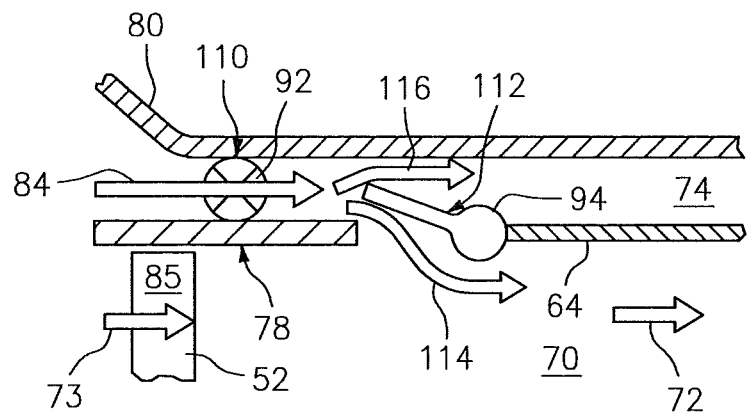
FIG. 5 is an enlarged view of the valve arrangement similar to FIG. 4 but with the selector valve in a second selected state.

Referring to FIG. 5, when the isolation valve 92 is in the open position 110 and the diverter valve 94 is in a controllably adjustable bypass stream receiving state 112, at least a portion (see arrow 114) of the bypass stream 84 enters the second flowpath 70 to join with the second stream 72. In addition, the diverter valve 94 may be appropriately positioned allowing for the remaining portion (see arrow 116) of the bypass stream 84 to enter the auxiliary flowpath 74 and join with the auxiliary stream 76. Although total pressure may be greater in the second pathway 70 than in the bypass duct 82, the static pressure may be about the same, thus allowing controlled flow to occur from the bypass duct 82 to the second flowpath 70. In this configuration, the engine 20 is capable of operating in an exhaust management mode at low-speed cruise flight conditions with low thrust.

Figure 6:
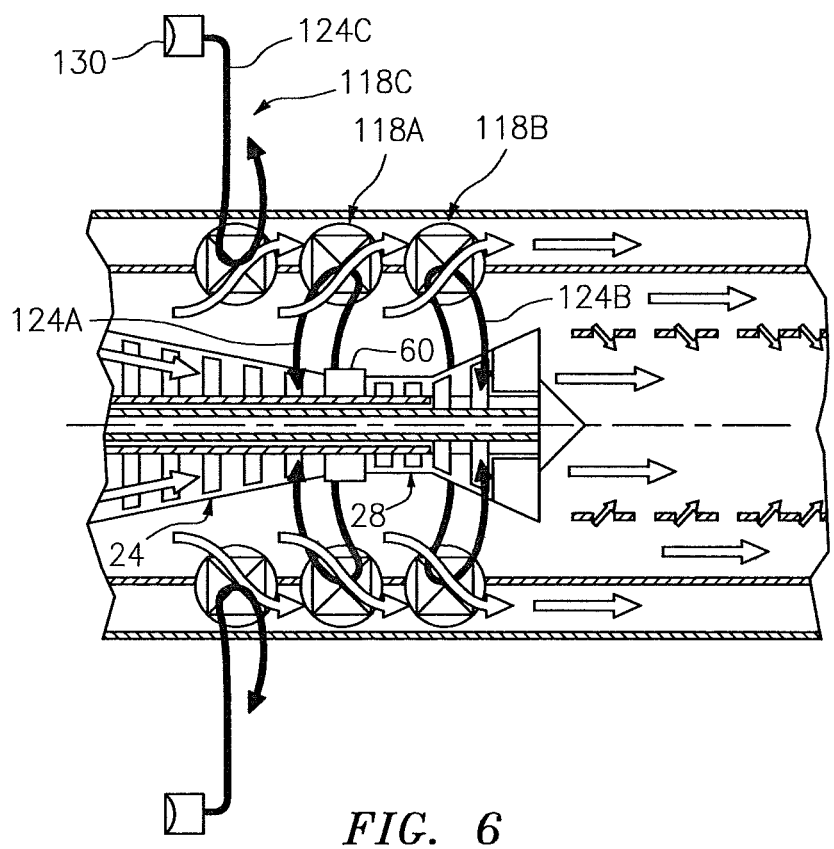
FIG. 6 is a partial schematic cross-section of the engine illustrating a plurality of heat exchanging devices of the engine.

Referring to FIGS. 1 and 6, the airflow control system 86 may also include at least one heat exchanging device 118 each having a heat exchanger 120, a control valve 122, and a pathway or conduit loop 124 for the supply flow of heated air and subsequent return of cooled air. Each valve 122 may be controlled via an electronic signal 126 from the controller 88. The heat exchanger 120 and valve 122 may be of an annular architecture and/or multiple discrete passages, ducts, or other selectively controlled flow path configurations distributed about the circumference of the second flowpath 70. The valve 122 selectively flows a portion (see arrow 128) of the second stream 72 from the second flowpath 70 into the auxiliary flowpath 74 via the cold side of the heat exchanger 120 for cooling the air flowing through pathway 124. With the control valve(s) 122 open, the stream portion 128 is generally heated and becomes part of the auxiliary stream 76 thereby acting as a 'heat sink' and increasing the auxiliary stream temperature.

As best shown in FIG. 6, examples of heat exchanging devices may include a device 118A with a pathway 124A that receives hot air from within the diffuser case module 60 and returns the air in a cooled state to the compressor section 24 for cooling of components therein. As another example, a device 118B may have a pathway 124B that receives hot air from the turbine section 28 and returns the air in a cooled state to the turbine section 28 for cooling of components therein. Yet another example may include a device 118C that may have a pathway 124C that receives hot air from a component 130 that is external to the engine 20 and returns the air to a location external from the engine 20. It is further contemplated and understood that the other pathways may flow hot air sourced from other engine sections, stages, or systems, and return the air in a cooled state to any one or combination of the engine sections, stages, or systems.

The heat exchanging device(s) 118 may also be utilized to vary the pressure drop in the second flowpath 70, as the pressure drop through the cold side of the heat exchanger 120 is enhanced through discharge of the selected portion 128 of the second stream 72 into the auxiliary flowpath 74, which may be at a lower pressure. It should also be appreciated that although particular systems are separately defined and schematically illustrated, such as the heat exchanger 120 and the valve 122, each, or any, may be otherwise combined or segregated. Alternatively, an operable valve may not be used and instead, the heat exchanger itself may have a pre-determined pressure drop (e.g. pre-sized, internal orifices) capable of establishing flows within an acceptable range. Yet further, the stream portion 128 flow may, at least in-part, be controlled via actuation of the valve arrangement 90 (i.e. with or without use of valve 122) that may controllably vary the pressure differential between the second flowpath 70 and the auxiliary flowpath 74.

Referring to FIG. 7, the engine 20 may operate under varying modes 132 and flight conditions 134 with a desired engine thrust level 136. For instance, with a mode 132 of maximum power and a flight condition 134 of takeoff, the thrust level 136 may be high. With this configuration, the airflow control system 86 may orientate the isolation valve 92 in the closed position 100 and the selector valve 94 in the neutral state 102. With this orientation, the second stream portion 128 flowing through the heat exchanger 120 of the heat exchanging device(s) 118 is not sourced from the bypass duct 82 and is solely sourced from the primary duct 85. The auxiliary stream 76 flow is thus sourced solely from the heat exchanger 120 cold side (i.e. second stream portion 128 flow) with no flow attributed directly from the bypass duct 82 or the primary duct 85. This results in a low flow condition through the auxiliary nozzle 79. The second stream 72 flow sources are attributable directly from the primary duct 85 with no flow directly from the bypass duct 82, resulting in a maximum flow condition through the second stream nozzle 77.

When the engine 20 operates with the mode 132 of exhaust management and a flight condition 134 of takeoff, climb and/or high cruise, the thrust level 136 may be high. With this configuration, the airflow control system 86 may orientate the isolation valve 92 in the closed position 100 and the selector valve 94 in the selected state 106. With this orientation, the second stream portion 128 flowing through the heat exchanger 120 of the heat exchanging device(s) 118 is not sourced from the bypass duct 82 and is solely sourced from the primary duct 85. The auxiliary stream 76 flow is thus sourced mostly from the primary duct 85 with a minor portion from the heat exchanger 120 cold side (i.e. second stream portion 128 flow), and with no flow attributed directly from the bypass duct 82. This results in a medium flow condition through the auxiliary nozzle 79. The second stream 72 flow sources are attributable directly from the primary duct 85 with no flow directly from the bypass duct 82, resulting in a high flow condition through the second stream nozzle 77.

When the engine 20 operates with the mode 132 of high efficiency and a flight condition 134 of loiter or cruise, the thrust level 136 may be medium. With this configuration, the airflow control system 86 may orientate the isolation valve 92 in the open position 110 and the selector valve 94 in the neutral state 102. With this orientation, the second stream portion 128 flowing through the heat exchanger 120 of the heat exchanging device(s) 118 is not sourced from the bypass duct 82 and is solely sourced from the primary duct 85. The auxiliary stream 76 flow is thus sourced mostly and directly from the bypass duct 82 with a minor portion from the heat exchanger 120 cold side (i.e. second stream portion 128 flow), and with no flow attributed directly from the primary duct 85. This results in a high flow condition through the auxiliary nozzle 79. The second stream 72 flow sources are attributable directly from the primary duct 85 with no flow directly from the bypass duct 82, resulting in a medium flow condition through the second stream nozzle 77.

When the engine 20 operates with the mode 132 of exhaust management and a flight condition 134 of low-speed cruise, the thrust level 136 may be low. With this configuration, the airflow control system 86 may orientate the isolation valve 92 in the open position 110 and the selector valve 94 in the selected state 112. With this orientation, the second stream portion 128 flowing through the heat exchanger 120 of the heat exchanging device(s) 118 is sourced mostly and directly from the primary duct 85 with a minor portion sourced directly from the bypass duct 82. The auxiliary stream 76 flow is thus sourced mostly and directly from the bypass duct 82 with a minor portion from the heat exchanger 120 cold side (i.e., second stream portion 128 flow), and with no flow attributed directly from the primary duct 85. This results in a medium flow condition through the auxiliary nozzle 79. The second stream 72 flow sources are mostly attributable directly from the primary duct 85 with a minor portion attributable directly from the bypass duct 82, resulting in a high flow condition through the second stream nozzle 77.

With the high spool driven aft stage 52 and the valve arrangement 90, the fan section 22 is higher in efficiency and higher in maximum fan pressure ratio (FPR) capability without compromise, when compare to more traditional engines. In addition, the HPT 56 is higher in efficiency and requires less cooling, and the LPT 48 may employ fewer stages and requires less cooling than more traditional engines. Similar to more traditional three stream engines, the present engine 20 with the HPT driven fan stage 52 provides for cruise power fan flow holding for reduced spillage drag. The auxiliary stream 76 pressure may be similar to a stage three in the more traditional three stream engines because of the pressure drop across the heat exchanging devices 118 resulting in similar propulsion efficiencies. The engine 20 of the present disclosure has higher fan pressure ratio capability than more traditional engines with a more balanced turbomachinery. This provides for a more compact propulsion system that is lighter and shorter.

While the invention is described with reference to exemplary embodiments, it will be understood by those skilled in the art that various changes may be made and equivalents may be substituted without departing from the spirit and scope of the invention. In addition, different modifications may be made to adapt the teachings of the invention to particular situations or materials, without departing from the essential scope thereof. The invention is thus not limited to the particular examples disclosed herein, but includes all embodiments falling within the scope of the appended claims.

What is claimed is:

1. A gas turbine engine comprising:
   a high spool constructed and arranged to rotate about an engine axis;
   a low spool constructed and arranged to rotate about the engine axis;
   a fan leading stage connected for rotation to the low spool;
   a fan aft stage connected for rotation to the high spool;
   a fan outer housing axially aligned to and circumferentially surrounding the leading and aft stages;
   a fan inner housing spaced radially inward from the outer housing, located aft of the leading stage, and circumferentially surrounding the aft stage, wherein a bypass duct is defined by and radially between the outer housing and the inner housing for at least partially flowing air from the leading stage;
   a core case concentrically located about the engine axis, wherein a core flowpath is defined radially inward of the core case for flowing a core stream;
   a second case spaced radially outward of the core case, wherein a second flowpath is defined radially between the core and second case for flowing a second stream; and
   an outer case spaced at least in-part radially outward from the second case, wherein an auxiliary flowpath is defined at least in-part radially between the second and outer cases for flowing an auxiliary stream;
   wherein the bypass duct is in selective, direct communication with the second flowpath and the auxiliary flowpath such that air in the bypass duct is provided alternatively into the auxiliary flowpath or the second flowpath.

2. The gas turbine engine set forth in claim 1 further comprising:
a high pressure turbine connected to the high spool.

3. The gas turbine engine set forth in claim 2 further comprising:
a low pressure turbine connected to the low spool.

4. The gas turbine engine set forth in claim 1 further comprising:
a control valve arrangement constructed and arranged to control airflow from the bypass duct to the second flowpath.

5. The gas turbine engine set forth in claim 4, wherein the control valve arrangement includes an isolation valve feature to selectively prevent flow through the bypass duct.

6. The gas turbine engine set forth in claim 5, Wherein the control valve arrangement includes a selector valve feature for controllably diverting airflow between the auxiliary and second flowpaths.

7. The gas turbine engine set forth in claim 1, further comprising:
an airflow control system including at least one heat exchanging device arranged to heat a portion of the second stream from the second flowpath upon entry into the auxiliary flow/path.

8. The gas turbine engine set forth in claim 7, wherein the at least one heat exchanging device includes a heat exchanger and a control valve constructed and arranged to control flow through the heat exchanger.

9. The gas turbine engine set forth in claim 8 further comprising:
a control valve arrangement constructed and arranged to control airflow from the bypass duct to the second flowpath, and wherein the airflow control system includes a controller constructed and arranged to control the control valve arrangement and the control valve of the heat exchanging device.

10. The gas turbine engine set forth in claim 7, wherein the heat exchanging device includes a conduit loop in direct fluid communication between the core flowpath and a hot side of the heat exchanger for flowing heated air from the core flowpath to the hot side and returning the cooled hot air from the hot side and through the core case for cooling components within the core case, and wherein a cold side of the heat exchanger is constructed and arranged to flow the portion of the second stream for cooling the hot air.

11. The gas turbine engine of claim 1, wherein
air flowing within the bypass duct is operable to flow out of the bypass duct into at least the second flowpath during a first mode; and
the air flowing with the bypass duct is operable to flow out of the bypass duct into at least the auxiliary flowpath during a second mode.

12. A gas turbine engine comprising:
a low pressure turbine;
a high pressure turbine proximate to the low pressure turbine;
a first fan stage driven by the low pressure turbine and comprising a first fan blade, wherein the first fan blade includes a first airfoil that extends in span to a tip of the first fan blade;
a second fan stage driven by the high pressure turbine and comprising a second fan blade, wherein the second fan blade includes a second airfoil that extends in span to a tip of the second fan blade, and the second airfoil is operable to receive air propelled by the first airfoil;
a core flowpath through an engine core downstream of the second fan stage;
a second flowpath radially outside of and surrounding the core flowpath; and
an auxiliary flowpath radially outside of and surrounding the core flowpath and the second flowpath;
wherein the second fan stage includes a bypass duct in direct, selective, communication between the auxiliary flowpath and the second flowpath, and the bypass duct is adapted to direct a bypass flow
at least partially into the auxiliary flowpath, independent of the second flowpath, during a first mode of gas turbine engine operation; and
at least partially into the second flowpath, independent of the auxiliary flowpath, during a second mode of gas turbine engine operation and
wherein the bypass duct circumscribes the second fan blade such that air in the bypass duct bypasses the second fan stage.

13. The gas turbine engine of claim 12, wherein air flowing within the second flowpath is operable to flow out of the second flowpath and into at least the auxiliary flowpath during a third mode of gas turbine engine operation.

14. The gas turbine engine of claim 12, wherein a first portion of the second flowpath is upstream of a fluid coupling between the second flowpath and the bypass duct, and a second portion of the second flowpath is downstream of the fluid coupling between the second flowpath and the bypass duct.

15. A method of operating a gas turbine engine comprising the steps of:
driving a leading stage of a fan section with a low spool;
driving an aft stage of a fan section with a high spool;
directing air from the leading stage to a bypass duct and to the aft stage, wherein the bypass duct circumscribes the aft stage of the fan section such that air in the bypass duct bypasses the second fan stage;
directing air from the aft stage to a core flowpath through an engine core and a second flowpath that is radially outboard of and surrounding the core flowpath;
controlling a valve arrangement to divert air flowing within the bypass duct out of the bypass duct and into the second flowpath during a first mode; and
controlling the valve arrangement to divert air flowing within the second flowpath out of the second flowpath and into an auxiliary flowpath during a second mode, wherein the auxiliary flowpath is downstream of the bypass duct and radially outboard of and surrounding the second flowpath.

16. The method set forth in claim 15 comprising the further step of utilizing a flow control system to controllably flow at least a portion of the air directed by the leading stage through the aft stage.

17. The method set forth in claim 15 comprising the further step of:
controlling the valve arrangement with a controller to control a flow of a bypass stream through the bypass duct.

* * * * *